Nov. 19, 1968     S. GREENBERG     3,411,501

THERMOPLASTIC MOUTHPIECE AND METHOD OF MAKING SAME

Filed March 2, 1966     2 Sheets-Sheet 1

INVENTOR
SAMUEL GREENBERG
BY Millman and Jacobs
ATTORNEYS

Nov. 19, 1968 S. GREENBERG 3,411,501
THERMOPLASTIC MOUTHPIECE AND METHOD OF MAKING SAME
Filed March 2, 1966 2 Sheets-Sheet 2
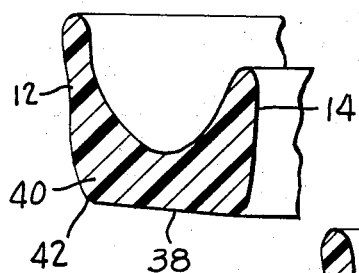
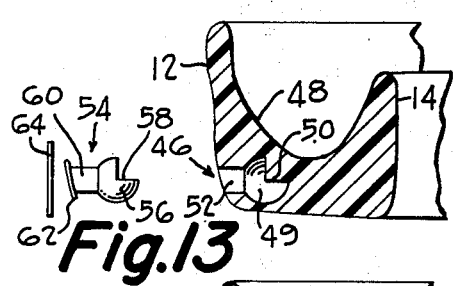
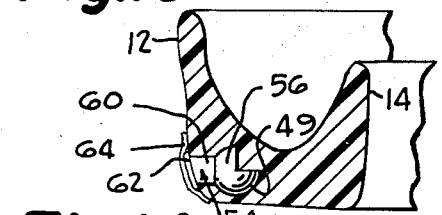
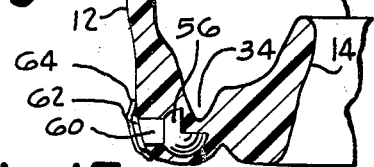
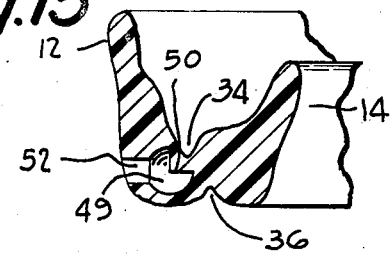
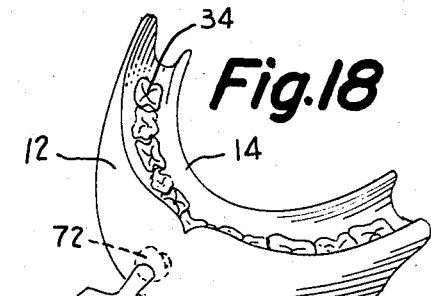
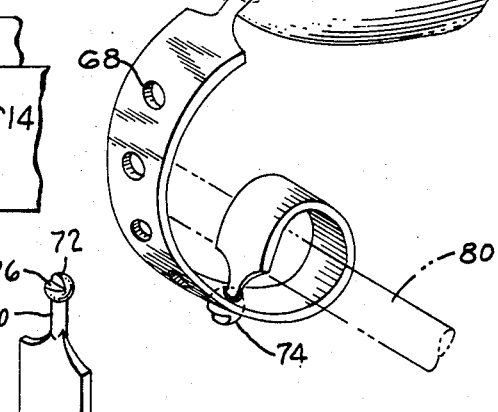
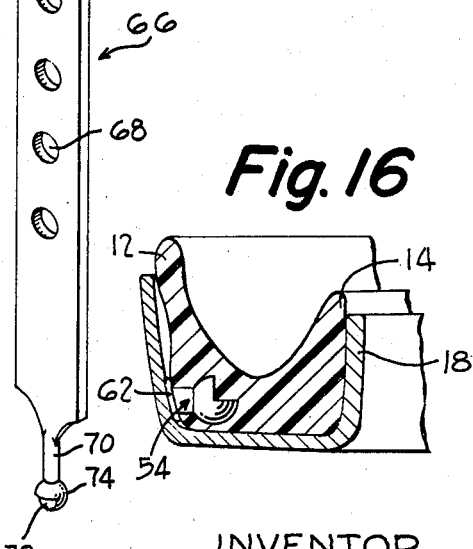
INVENTOR
SAMUEL GREENBERG
BY Millman and Jacobs
ATTORNEYS United States Patent Office 3,411,501
Patented Nov. 19, 1968

3,411,501
THERMOPLASTIC MOUTHPIECE AND METHOD OF MAKING SAME
Samuel Greenberg, 1902 Chestnut St., Philadelphia, Pa. 19103
Continuation-in-part of application Ser. No. 321,560, Nov. 5, 1963. This application Mar. 2, 1966, Ser. No. 531,123
15 Claims. (Cl. 128—136)

ABSTRACT OF THE DISCLOSURE

A saddle for use in making a mouthpiece comprised of a substantially U-shaped member of channel cross-section including an outer flange, a lingual flange and a web joining them and made of a plastic such that at a predetermined temperature range below that of boiling water the saddle will retain its essential shape but will be soft enough to take teeth impressions and to retain the teeth impressions below the softening range; a method by which the saddle is used to take teeth impressions in the mouth so that impressions of one set of teeth will be formed on the inside thereof and the impressions of the bite surface of the opposite set of teeth will be formed in the outside surface of the web to thus form a mouth guard which protects both sets of teeth; and the provision of means whereby a strap for attachment to a face or chin guard is removably attached to the mouthguard so that a strong pull thereon will separate the strap from the mouthguard and allow the latter to remain in place over the teeth for continued protection.

---

This is a continuation-in-part of application Ser. No. 321,560, filed Nov. 5, 1963 now Patent No. 3,250,272 issued May 10, 1966 and relates to a guard to protect the teeth, mouth and lips of athletic contestants.

The primary object of the invention is to provide a mouthpiece or guard made of a high molecular weight thermoplastic resin which is tough and has rubber-like flexibility and which is pre-molded by a relatively simple technique to form a standard substantially U-shaped saddle. The saddle is rapidly softened and inserted in the mouth over the upper teeth where it takes the impression of the teeth and at the same time rapidly hardens to produce the final mouthpiece, thereby producing a guard with maximum protection and comfort.

Another object of the invention is to provide a saddle to be formed into a mouthpiece of the character described in which the resin from which it is made is a binary or true ethylene-vinyl acetate copolymer having a melt index of 3.5 to 25 and density of 0.95 at 23° C. and which retains its essential shape and resiliency at body and room temperatures but is capable of being softened sufficiently of rendered formable to take accurate teeth impressions under finger pressure at temperatures down to 120–127° F., which impressions become fixed below this temperature. Thus, the instant saddle may be rapidly and accurately molded in the mouth at comfortable temperatures and with a minimum of manipulative skill to form a mouthpiece which incorporates teeth indentations.

Another object of the invention is to provide a standard substantially U-shaped saddle made of a high molecular weight binary ethylene-vinyl acetate copolymer of the character above described which can be rapidly softened, applied to the teeth and molded to incorporate the upper teeth indentations on the inside thereof and the lower teeth indentations on the outside to provide a natural, comfortable and secure seat for the lower teeth, which construction also acts to protect both the upper and lower teeth not only by cushioning them but also by displacing direct blows equally over the entire arch.

Another object of the invention is to provide a molded mouthpiece of the character described, a strap to attach the same to a face guard of chin strap and break-away means connecting the strap to the mouthpiece so that an impact applied with sufficient force to twist, displace or remove the face guard or chin strap on the face will also cause the mouthpiece strap to separate from the mouthpiece, thereby eliminating damage to the teeth which can occur due to the exertion of a pulling force thereon if the strap were fixedly secured to the mouthpiece and also allowing the mouthpiece to remain in place on the teeth to continue to guard the same.

Another object of the invention is to provide an easily operable method of molding a mouthpiece in the mouth to incorporate teeth indentations and of effecting a secure removable connection of an attaching strap thereto without sacrificing the exactness of fit of the mouthpiece.

These and other objects of the invention will become more apparent as the following description proceeds in conjunction with the accompanying drawings, wherein:

FIG. 10 is a sectional view similar to FIG. 2 of a modified form of the saddle;

FIG. 11 is a view similar to FIG. 10 of another modified form of the saddle;

FIG. 12 is a sectional view similar to FIG. 10 of yet another form of the saddle with a recess therein;

FIG. 13 is a view similar to FIG. 12 showing the plug in place in the saddle and there retained by a tape;

FIG. 14 is a sectional view of the saddle of FIG. 13 molded into a mouthpiece with the plug therein;

FIG. 15 is a sectional view of the mouthpiece of FIG. 14 with the plug removed;

FIG. 16 is a sectional view through a tray and a saddle with a plug therein and showing the plug being retained in the saddle by the tray;

FIG. 17 is a perspective view of an attaching strap; and

FIG. 18 is a perspective view of a mouthpiece with the attaching strap removably secured thereto.

Specific reference is now made to the drawings wherein similar reference characters are used for corresponding elements throughout.

Figure 1:
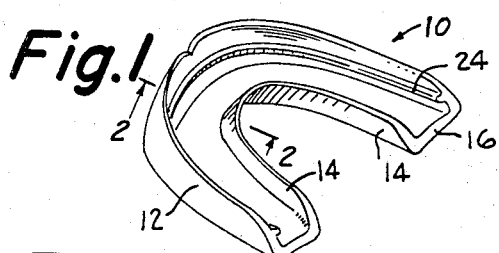
FIG. 1 is a perspective view of the standard saddle employed in the formation of the instant mouthpiece.

The saddle and the mouthpiece into which it is formed, in a manner to be set forth hereinafter, are made of high molecular weight binary or pure ethylene-vinyl acetate copolymers which are tough, have a rubber-like flexibility or resilience and have high stress crack resistance even at low temperatures. The average properties which these resins possess are as follows: a melt index of 3.5–25 dg./min., a density at 23° C. of 0.95 g./cc., a tensile strength at 73° F. of 1550–2000 lb./sq. in., an elongation at 73° F. of 800–900%, a stiffness at 73° F. of 1200–1770 lbs./sq. in., a tensile impact at 73° F. of 200–330, a softening point, Vicat, of 120–127° F. and an index of refraction of 1.480–1.485, all determined by ASTM methods. They contain 28–33% by weight of vinyl acetate. They are also odorless, tasteless and non-toxic. Such resins are commercially available from Du Pont as Alathon 3175, 3180 and 3185.

The saddle indicated generally at 10, is a substantially U-shaped member of channel cross-section having an outer flange 12 and a lower inner or lingual flange 14 connected by a web portion 16. Its outer surface tapers upwardly at its distal ends while the posterior ends of the inner and outer flanges taper anteriorly. The saddle is readily and easily made by conventional injection molding techniques or, if desired, by a casting technique wherein the sheet of the resin is softened by placing it in boiling water for about a minute, inserting it in a female metal mold of shape and cross-section conforming to that described above, closing and pressing a male mold therein and removing the saddle after about one minute as the mold cools.

If the saddle is made of an ethylene-vinyl acetate copolymer having a melt index of about 3.5 and a softening point of about 127° F. (Alathon 3175), it is desirable that the softened saddle be inserted in the mouth via a horseshoe-shaped tray 18 of channel cross-section similar to the saddle but preferably made of a plastic, such as polyethylene, polypropylene or polystyrene, whose softening point is above that of the saddle and which is sufficiently flexible to permit accommodation of the saddle to the teeth by flexion.

The saddle is placed in a shallow pan of water 20 which is brought to a full boil and kept at a slow boil for about 75 seconds. If desired, the level 22 of the water may cover the line 24 inscribed on the inside of the outer flange 12 defining a horizontal plane just at or slightly above the upper edge of the inner flange 14 so that the saddle can be lifted from the water by the portion 26 of the outer flange 12 above the line 24. Thus, by subjecting the saddle to the temperature of boiling water for this short period of 75 seconds, it attains a temperature of about 165° F. and softens sufficiently to become impressionable without losing its original horseshoe channel form. The saddle may also be softened by keeping it in water at a temperature above its softening point but below the boiling point of water for a longer period of time, but this is not necessary nor particularly desirable.

Figure 6:
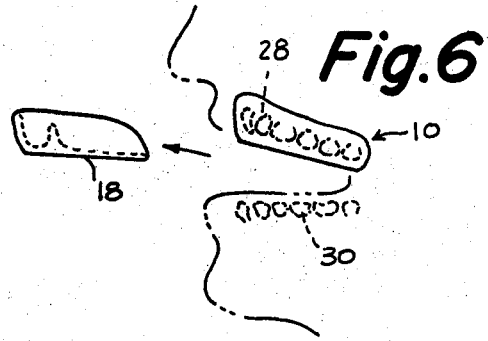
FIG. 6 is a view similar to FIG. 5 with the tray removed.
Figure 7:
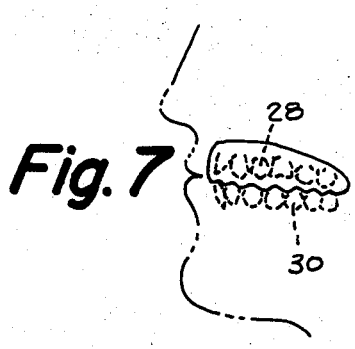
FIG. 7 is a view similar to FIG. 6 showing the molding of the upper and lower teeth indentations in the saddle in the bite position.
Figure 8:
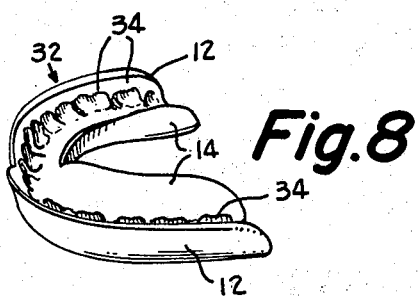
FIG. 8 is a perspective view of the mouthpiece looking at the interior thereof.
Figure 9:
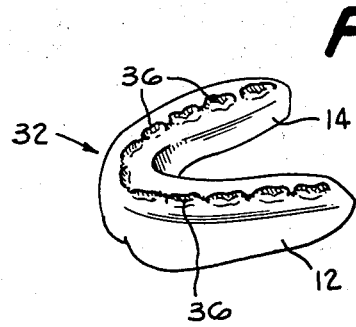
FIG. 9 is a view similar to FIG. 8 looking at the exterior of the mouthpiece.

The softened saddle is then removed from the water, placed in and adapted to the contour of the tray 18, inserted at a comfortable temperature into the mouth (which was previously rinsed with cold water) over the upper teeth 28 and under the upper lip and pushed upwardly and backwardly with strong finger pressure. This procedure is generally accomplished in about 5 seconds so that the saddle can still retain its essential form and take the impression at said elevation softening temperature. After the tray and saddle are thus kept in the mouth for about 10 seconds with constant application of finger pressure, the tray 18 is removed, the saddle remaining in place over the upper teeth, as seen in FIG. 6. The patient then bites firmly into the saddle with the lower teeth 30 for about 30 seconds while pressure is applied and maintained against the teeth going from front, to sides, to back.

The saddle is then removed and cooled below about 127° F. to fix the teeth impressions therein. Most desirably, it is rinsed in cold water for about 20 seconds to cause the impressions to fix rapidly. The saddle is then reinserted in the mouth to check for retention and for over extended and thick areas, which can be cut away with a sharp scissors or warm knife. At mouth temperature, e.g., about 98–99° F., the mouthpiece is tough and resilient and the teeth impressions retain their molded-in fixed positions. In its final preferred form, the guard 32 has indentations 34 on the inside thereof in the outer flange 12 and the web 16 formed as impressions of the front and lower surfaces of the upper teeth respectively and indentations 36 on the outside thereof in the thicker portion of the web 16 as impressions of the biting surfaces of the lower teeth. In use the mouthpiece acts effectively to cushion against direct blows, and because the inner and outer indentations act to locate the bite of the teeth, the blows are displaced equally over the entire arch of the mouth.

When the saddle is made of an ethylene-vinyl acetate copolymer having a melt index of about 15 and a softening point of about 120° F. (Alathon 3180), the saddle can be softened sufficiently to take teeth impressions without losing its essential horseshoe-shaped channel form at lower temperatures than that described hereinbefore. Thus, it can be placed in boiling water for about 8–60 seconds, depending upon the thickness of the saddle, and then placed directly over the teeth without the use of the tray 18 and held there until the teeth impressions are fixed therein by pressing the tongue against the upper palate in a sucking motion for a few seconds, after which the guard is placed in cold water.

Figure 2:
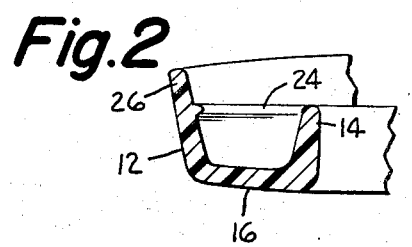
FIG. 2 is a sectional view taken on the line 2—2 of FIG. 1.
Figure 3:
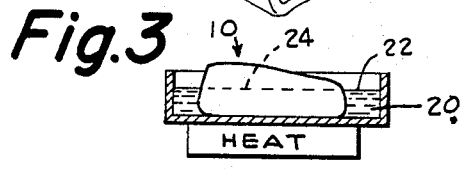
FIG. 3 is a diagrammatic view illustrating the heating of the saddle to soften it.
Figure 4:
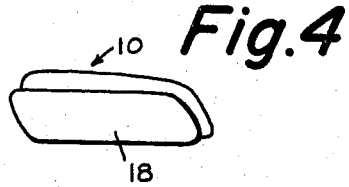
FIG. 4 is a side elevational view of the softened saddle positioned in a tray.
Figure 5:
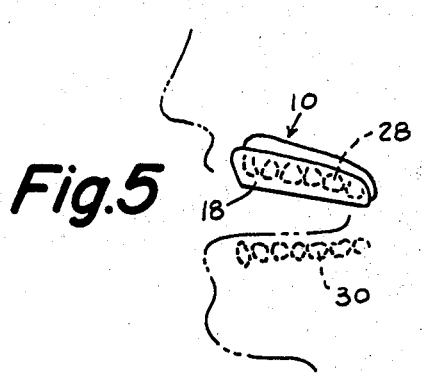
FIG. 5 is a side elevational view showing the insertion of the tray and saddle in the mouth over the upper teeth.

The saddle may take the form shown in FIG. 10 in which the outer flange 12 and lingual flange 14 are as shown in FIG. 2 but the web 38 is inwardly thickened as at 40 along the front lower edge 42 of the mouthpiece to afford greater protection to the front teeth.

The saddle shown in FIG. 11 also has an outer flange 12 and lingual flange 14 as shown in FIG. 2, but its web 44 tapers in thickness downwardly from the inner or lingual flange 14 to the outer flange 12 so that the impressions 34 on the inside of the channel and the impressions 36 of the bite surface of the opposite set of teeth in the web 44 can coexist without sacrificing thickness of the web as required for proper protection.

As will be evident, mouthpieces can be readily lost or misplaced. To minimize this it is desirable to attach the mouthpiece either to the face guard or chin strap of a helmet. However, since a molded mouthpiece is made to fit snugly around the teeth, if such a mouthpiece is fixedly attached to the face guard or chin strap, a force tending to remove or rip off the helmet will be transmitted to the mouthpiece and in turn to the teeth as a pulling force, causing pain or damage to the teeth, perhaps even their extraction. The construction shown in FIGS. 12–18 overcomes this disadvantage. The saddle 10 is originally formed with a recess 46 which terminates inwardly of the inner wall 48 of the saddle in an enlarged generally spherical end 49 with a corner portion 50 of the saddle extending therein at a point opposite the two front teeth. The recess has a narrower throat 52 which opens through the flange 12 centrally thereof and adjacent the lower front edge 42. A plug 54 made of a plastic other than the ethylene-vinyl acetate copolymer used for the saddle but which does not soften below about 130–165° F., and preferably below 212° F., such as polyethylene, the acrylics, etc., is inserted in the recess 46. The plug comprises an enlarged generally spherical head 56 with a cut-out portion 58 therein which corresponds to the end portion 49 and corner portion 50 of the recess. The plug head is connected to a narrower stem or isthmus 60 which corresponds to the throat 52 and which has a button 62 larger in diameter than the opening of the throat 52 of the recess 46. Proper insertion of the plug in the recess is effected when the cut-out portion 58 of the plug registers with the corner portion 50 of the recess. A vinyl tape 64 is placed over the button 62 and against the outer face of the flange 12 to keep the plug in place.

The saddle with the plug in place is softened, inserted in the mouth around the teeth and retained therein until the indentations 34 and/or 36 are fixed therein. The corner portion 50 of the recess acts to permit sufficient material of the saddle to be present to take a proper impression of the two front teeth and leave sufficient material to protect the teeth. During the molding, the plug acts to impart dimensional integrity to the recess 46, the enlarged portion 49 and the throat 52 thereof and when the tape 64 and plug 54 are removed the molded guard takes the form shown in FIG. 15.

If the saddle is made of an ethylene-vinyl acetate copolymer with a melt index of 3.5, thus requiring the carrier tray 18 for insertion in the mouth over the teeth, no tape 64 is required to hold the plug in place in the saddle since the tray does this, as shown in FIG. 16.

A strap 66 is provided which is made of the same resin as the saddle, is preferably flat and has spaced apertures 68. Both ends of the strap have reduced portions 70 corresponding in diameter to the throat 52 of the recess in the guard and generally spherical heads 72 and 74 with cut-out segments 76 and 78 which correspond to the end portion 49 and corner portion 50 of the recess 46 in the guard, except that the head 74 is preferably somewhat larger than head 72.

By flexing the mouthpiece so that the opening of the throat 52 of the recess is enlarged, the head 72 can be inserted therein and turned until its cut-out portion 76 registers with the corner portion 50, in which position the narrow portion 70 extends through the throat 52. By looping the other end of the strap over the bar 80 of a face guard or a chin strap, as shown in FIG. 18, and then inserting the head 74 through a selected aperture 68, the guard can be adjustably retained on the face guard or chin strap. It will be seen, however, that because of the removable connection of the strap to the guard, when an impact is encountered sufficient to substantially move or rip off the face guard or chin strap, the head 72 of the strap will pull out of the recess 46 in the mouthpiece, thereby freeing the strap from the mouthpiece and relieving the pulling pressure on the teeth. Should the recess 45 in the mouthpiece become enlarged through excessive use, the strap may be reversed and the larger head 74 (i.e. about 4 mm. in diameter as compared to 3 mm. for the head 72) used for insertion into the recess of the mouthpiece.

While preferred embodiments have here been shown and described, it will be understood that skilled artisans may make minor variations without departing from the spirit of the invention and the scope of the appended claims. Thus, for example, where a person has a prominent jaw, the softening saddle may be placed over the lower teeth and there molded with the indentations 36 on the outside thereof constituting the impressions of the biting surfaces of the upper teeth.

Also, the strap can be removably attached to a standard, pre-formed, non-impressionable, non-fitted mouth piece made, for example, of such materials as rubber, polyvinyl chloride, etc. In that case the mouthpiece will be in the form of the saddle 10 shown in FIGS. 1 and 2 and will be provided with the recess 46, as shown in FIG. 12, which will removably receive the head 72 and stem 70 of the strap 66.

The strap can also be removably attached to form-fitting mouthpieces made of impressionable materials other than the ethylene-vinyl acetate copolymers described hereinbefore or of a different combination of materials such, for example, as a non-impressionable U-shaped member of channel cross-section, as shown in FIGS. 1 and 2, with an impressionable filler in the web thereof, in which case the U-shaped member will be equipped with a recess 46 and will removably retain a plug 54 during the molding of the teeth therein, after which the plug will be removed and the recess will removably receive the head 72 and stem 70 of the strap 66, as shown in FIGS. 12-15, 17 and 18.

Further, although the use of cut-out portions 58, 68, 82 and 84 in the head portions of the plug, guard recess, and strap ends is desirable not only for the proper molding of the two front teeth but also for better strap retention in the mouthpiece, these head portions can also be made spherical or of similar enlarged contours for releasable locking action.

I claim:
1. A saddle for use in making a mouthpiece comprised of a substantially U-shaped member of channel cross-section including an outer flange, a lingual flange and a web joining them and made of a plastic such that at a predetermined temperature range below that of boiling water the saddle will retain its essential shape but will be soft enough to take teeth impressions and to retain the teeth impressions below the softening range, and a recess in the outer flange having an enlarged portion and a narrower throat opening only through the outer face thereof adapted to removably receive a portion of an attaching strap.

2. The saddle of claim 1 and a plug removably retained in said recess and adapted to be replaced by a portion of an attaching strap.

3. The saddle of claim 2 wherein the plug is made of a material which does not soften at or below the predetermined softening range of the saddle.

4. The saddle of claim 1 and an elongated strap, means to attach one end of the strap to a face or chin guard and means at the other end of said strap engageable in said recess to removably attach the same to the saddle.

5. The saddle of claim 4 wherein said enlarged portion of said recess is generally spherical and said means to secure the other end of the strap to the saddle includes a stem at the other end of the strap extending through and approximating the diameter of the throat and a generally spherical member on the stem of a diameter approximating the spherical portion of the recess and seated therein.

6. The combination of claim 5 wherein said saddle includes a corner portion centrally of said outer flange and adjacent said web which extends into said recess and a cut-out portion in said spherical member of said strap receiving said corner portion.

7. The combination of claim 4 wherein said means to attach said one end of said strap to a face or chin guard includes a generally spherical head and apertures in said strap adapted to receive said spherical head.

8. The saddle of claim 1 wherein the plastic is a thermoplastic binary ethylene-vinyl acetate copolymer having a melt index of about 3.5–25 dg./min., a softening point of about 120–127° F. and an index of refraction of about 1.480–1.485, said saddle being sufficiently soft to take teeth impressions under finger pressure between said range of 120–127° F. and about 165° F. without losing its essential U-shape and channel cross-section and to retain the teeth impressions fixed therein below 120–127° F.

9. A preformed saddle for use in making a mouthpiece be soft enough to take teeth impressions and to retain the cross-section including an outer flange, a lingual flange and a web joining them and made of a plastic such that at a predetermined temperature range below that of boiling water the saddle will retain its essential shape but will be soft enough to take teeth impressions and to retain the teeth impressions below the softening range, the web having a mean thickness exceeding that of the outer and lingual flanges so that when the inner surface of the web contains the impressions of one set of teeth and the outer surface of the web contains impressions of the bite surface of the opposite set of teeth, a thickness of material is present in the web between impressions to protect both sets of teeth.

10. A mouthpiece made of a saddle comprised of a substantially U-shaped member of channel cross-section including an outer flange, a lingual flange and a web joining them and made of a plastic such that at a predetermined temperature range below that of boiling water the saddle will retain its essential shape but will be soft enough to take teeth impressions and to retain the teeth impressions below the softening range, and a recess in the outer flange opening only through the outer face thereof adapted to removably receive a portion of an attaching strap, and impressions of one set of teeth fixed on the inside of said channel, said recess including a generally spherical portion and a narrower throat opening through the outer face of the outer flange, a stem at the other end of the strap extending through and approximating the diameter of the throat and a generally spherical member on the stem of diameter approximating the recess and seated therein.

11. A mouthpiece comprised of a U-shaped member of channel cross-section including an outer flange, a lingual flange and a web joining them, an elongated strap, means to attach one end of said strap to a face or chin guard, and means removably securing the other end of said strap to said mouthpiece, said last-named means including a recess in said outer flange having an enlarged portion and a narrower throat opening through the outer face thereof, said other end of said strap including a stem corresponding to said throat and extending therein and an enlarged head on said stem received in said enlarged portion of said recess.

12. A method of making a mouthpiece comprised of providing a substantially U-shaped saddle of channel cross-section including an outer flange, a lingual flange and a web joining them and made of a plastic such that at a predetermined temperature range below that of boiling water the saddle will retain its essential shape but will be soft enough to take teeth impressions and to retain the teeth impressions below the softening range, and a recess in the outer flange opening only through the outer face thereof, inserting a plug in the recess of a material which does not soften at or below the softening range of the saddle, subjecting the saddle with the plug therein to a hot fluid so that the saddle attains a temperature at which it softens but retains its essential shape, placing the softened saddle over a set of teeth and applying pressure thereto to form teeth impressions therein, and removing the plug.

13. The method of claim 12 wherein said plug comprises a stem with an enlarged head and said recess conforms thereto.

14. The method of claim 13 and the steps of providing an elongated strap with at least one end conforming to said recess and removably inserting said one end of said strap into said recess after removal of said plug.

15. A method of making a mouthpiece comprised of providing a substantially U-shaped member of channel cross-section including an outer flange, a lingual flange and a web joining them and made of a plastic such that at a predetermined temperature range below that of boiling water the saddle will soften but retain its essential shape, subjecting the saddle to a hot fluid so that the saddle attains said softening range, placing the softened saddle in a flexible U-shaped forming tray of channel cross-section and of the same general shape but somewhat larger than the saddle made of a plastic whose softening point is above the softening range of the saddle, inserting the saddle and tray in the mouth and pressing the saddle over a set of teeth to form teeth impressions therein, removing the saddle and tray, separating the tray and cooling the saddle below its softening range to fix the teeth impressions therein.

References Cited

UNITED STATES PATENTS

| | | | |
|---|---|---|---|
| 2,521,039 | 9/1950 | Carpenter | 128—136 |
| 3,060,935 | 10/1962 | Riddell | 128—260 |
| 3,124,129 | 3/1964 | Grossberg | 128—136 |
| 3,178,820 | 4/1965 | Kesling | 32—14 |
| 3,211,143 | 10/1965 | Grossberg | 128—136 |
| 3,224,441 | 12/1965 | Monaghan | 128—136 |
| 3,314,423 | 4/1967 | Boatwright | 128—136 |

ADELE M. EAGER, *Primary Examiner.*

UNITED STATES PATENT OFFICE
CERTIFICATE OF CORRECTION

Patent No. 3,411,501                      November 19, 1968

Samuel Greenberg

It is certified that error appears in the above identified patent and that said Letters Patent are hereby corrected as shown below:

Column 1, line 55, for "of", second occurrence, read -- or --; column 3, line 6, for "28-33%" read -- 28-32% - column 6, line 49, strike out "be soft enough to take teeth impressions and to retain the" and insert instead -- comprised of a substantially U-shaped member of channel --.

Signed and sealed this 24th day of June 1969.

(SEAL)
Attest:

Edward M. Fletcher, Jr.                    WILLIAM E. SCHUYLER, JR.
Attesting Officer                                 Commissioner of Patents